United States Patent

Wei et al.

[11] Patent Number: 5,822,375
[45] Date of Patent: Oct. 13, 1998

[54] METHOD FOR DETECTING RECEIVED SIGNAL SEQUENCES

[76] Inventors: Ruey-Yi Wei, 7F., No. 91, Lane 71, Chiang Nan St., Nei Hu Chu, Taipei; Mao-Chao Lin, 2F., No. 94-1, Hsiu-Liang Road, Sec. 1, Yung-Ho, Taipei Hsien, both of Taiwan

[21] Appl. No.: 654,125

[22] Filed: May 28, 1996

[51] Int. Cl.⁶ .............................. H03D 3/22; H04L 27/22
[52] U.S. Cl. .......................... 375/330; 375/280; 375/331
[58] Field of Search .................................. 375/280, 283, 375/279, 324, 329, 330, 331, 332

[56] References Cited

U.S. PATENT DOCUMENTS

| | | | |
|---|---|---|---|
| 5,506,873 | 4/1996 | Suzuki | 375/324 |
| 5,581,582 | 12/1996 | Choi | 375/329 |
| 5,619,167 | 4/1997 | Adachi | 375/329 |
| 5,654,667 | 8/1997 | Adachi | 375/324 |

*Primary Examiner*—Chi H. Pham
*Assistant Examiner*—Emmanuel Bayard
*Attorney, Agent, or Firm*—Bacon & Thomas

[57] ABSTRACT

This invention is a method for detecting received signal sequences of a communication system transmitting differentially encoded MPSK (Multiple Phase Shift Keying) signal sequences. This invention uses previously received signal samples and previously decided data phases to generate a phase reference for the current operation of detecting the received signal sample. The phase reference can be easily generated by a recursive form.

12 Claims, 6 Drawing Sheets

METHOD FOR DETECTING RECEIVED SIGNAL SEQUENCES

BACKGROUND OF THE INVENTION

For an MPSK transmission system, differential detection is preferred over coherent detection if the phase coherence is hard to obtain. The conventional (one-symbol) differential detection method uses a delayed version of received signal sequence as a phase reference for detection, which is equivalent to using the previously received signal sample as the phase reference to detect the currently received signal sample. Such a phase reference is likely to have been corrupted by noise. Hence, the error performance of the conventional (one-symbol) differential detection method is somewhat worse than that of the coherent detection method. To improve the error performance of differential detection, several multiple-symbol differential detection methods have been proposed. Among them, the complexity of implementation for decision feedback differential phase detection (DF-DPD) is relatively low. The DF-DPD method is a simplified version of a method called decision feedback differential detection (DF-DD). By setting all the amplitudes of received signal samples to be constant, DF-DD reduces to DF-DPD. Either the DF-DD or the DF-DPD method employs L previously received signal samples and L−1 data phases which were previously decided to detect the currently received signal sample. The operation of DF-DD and DF-DPD can be briefly described as follows.

Suppose that differentially encoded MPSK signal sequences are transmitted over a communication channel. Let r(t) be the received signal for time t. Then, R(t')={r(t) :−∞<t ≤t'} is the received signal sequence up to time t'. Let T be the time interval between two adjacent received signal samples. Through a certain process of the received signal sequence, we have the received signal sample for time kT which is $$r_k = \sqrt{2P}\, e^{j\phi_k} e^{j\theta_k} + N_k, \quad (1)$$

where P is the signal power, $\emptyset_k$ is the modulation phase, $\theta_k$ is an arbitrary phase introduced by the channel, and $N_k$ is a sample of noise. The modulation phase is $\emptyset_k = 2\pi m/M$ for some $m \in \{0,1,\ldots,M-1\}$, where M is the number of points in the signal constellation which we use. Let x be an arbitrary phase value. We define x mod2π=x+2Kπ, where K is an integer such that −π<x+2Kπ≤π. The information data for time kT is carried by the data phase $\Delta\emptyset_k = (\emptyset_k - \emptyset_{k-1})$ mod 2π. There are M possible values of $\Delta\emptyset_k$ which correspond to the M possible information data. The received signal sample $r_k$ can be expressed by $$r_k = |r_k| e^{j\psi_k}, \text{tm (2)}$$

where $|r_k|$ and $\psi_k$ are the amplitude and phase of the received signal sample $r_k$ respectively and $j=\sqrt{-1}$. The phase, $\psi_k$, can be represented as $$\psi_k = (\emptyset_k + \eta_k + \theta_k) \bmod 2\pi, \text{tm (3)}$$

where $\eta_k$ is the phase noise due to the existence of $N_k$.

For the DF-DD method, the decision rule is to determine the data phase $\Delta\bar{\emptyset}_n$ for time nT which is the one among all the M possible values of $\Delta\emptyset_n$ that maximizes $$X_n = \sum_{l=1}^{L} |r_{n-l}| \cos\left(\psi_n - \psi_{n-1} - \Delta\phi_n - \sum_{i=1}^{l-1} \Delta\bar{\phi}_{n-i}\right) \quad (4)$$

$$= \sum_{l=1}^{L} |r_{n-l}| \cos\left(\Delta\psi_n(l) - \Delta\phi_n - \sum_{i=1}^{l-1} \Delta\bar{\phi}_{n-i}\right),$$

where $\Delta\psi_n(l)=\psi_n-\psi_{n-l}$ is the l-interval phase difference for time nT and $\Delta\bar{\emptyset}_{n-i}$ is the data phase that has already been decided for time (n−i)T. There are several ways to obtain $\Delta\psi_n(l)$. We may obtain $\Delta\psi_n(l)$ by subtracting $\psi_{n-l}$, the phase of the received signal sample at time (n−l)T, from $\psi_n$, the phase of the received signal sample at time nT. We may also obtain $\Delta\psi_n(l)$ by directly processing a received signal sequence and a delayed version of it to extract the phase difference. The parameter $X_n$ can also be expressed as $$X_n = \sum_{l=1}^{L} |r_{n-l}| \cos(\psi_n - \Psi_{n-1}^{(l)} - \Delta\phi_n), \quad (5)$$

where $$\Psi_{n-1}^{(l)} = \psi_{n-l} + \sum_{i=1}^{l-1} \Delta\bar{\phi}_{n-i}, \quad (6)$$

which is a primitive phase reference for time (n−1)T and is derived from $\psi_{n-l}$. Define $$\mu_n^{(l)} = (\psi_n - \Delta\phi_n - \Psi_{n-1}^{(l)}) \bmod 2\pi \quad (7)$$

$$= (\psi_n - \Delta\phi_n - \Psi_{n-1}^{(l)}) + 2K_{n-1}^{(l)}\pi,$$

where $K_{n-1}^{(l)}$ is an integer which is used such that $-\pi<\mu_n^{(l)} \leq \pi$. The parameter $\mu_n^{(l)}$ is an estimated phase error of $\psi_n$ obtained by comparing $\psi_n$ with $\Psi_{n-1}^{(l)}+\Delta\emptyset_n$. Since the shape of the curve of cosx is similar to the shape of the curve of $1-x^2$ for $-\pi<x\leq\pi$, we can use an approximation to simplify the decision rule of DF-DD. The simplified decision rule is to find the one among M possible $\Delta\emptyset_n$ which minimizes $$Y_n = \sum_{l=1}^{L} |r_{n-l}| (\mu_n^{(l)})^2. \quad (8)$$

Decision feedback differential phase detection (DF-DPD) is a simplified version of DF-DD, for which all the amplitude factors are considered as constant. That means the decision rule of DF-DPD is to determine $\Delta\bar{\emptyset}_n$ which is the one among the M possible values of $\Delta\emptyset_n$ such that $$Z_n = \sum_{l=1}^{L} (\mu_n^{(l)})^2 \quad (9)$$

is minimized. Either DF-DD or DF-DPD have pretty good error performance and relatively low complexity. However, there is still much room for improvement. For either DF-DD or DF-DPD, the current detection operation is dependent on L previously received signal sample and L−1 previously decided data phases. In general, increasing L will improve the error performance and will also increase the complexity of detection. In this invention, inventors propose a novel differential detection method, for which the current detection operation employs a phase reference which is dependent on all the previously received signal sample and all the previously decided data phases. The phase reference can be easily generated from a simple recursive form. The proposed defferential detection method has low complexity of detection and has very good error performance.

SUMMARY OF THE INVENTION

This invention is a method for detecting the received signal sequences of a communication system transmitting differentially encoded MPSK signal sequences. This method uses previously received signal samples and previously decided data phases to generate a phase reference for the current operation of detecting the received signal sample. The phase reference can be easily generated by a recursive form. Therefore, the differential detection method of this invention has low complexity of detection. Moreover, the differential detection method of this invention has very good error performance.

DESCRIPTION OF THE PREFERRED EMBODIMENT

Figure 1:
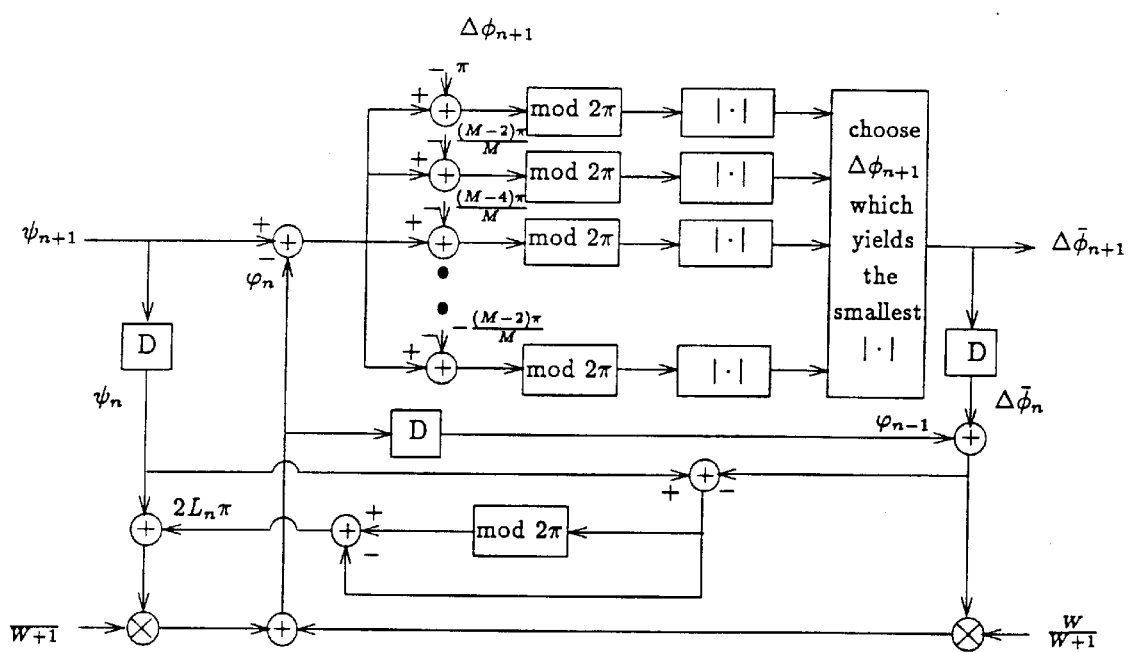
FIG. 1 illustrates block diagram for the first embodiment.

This invention is a method for detecting the received signal sequences of a communication system transmitting differentially encoded MPSK signal sequences. The output of the detection operation of the invention for time (n+1)T is denoted by $\Delta\emptyset_{n+1}$. In this invention, $\Delta\emptyset_{n+1}$ is chosen to be the one among the M possible values of $\Delta\emptyset_{n+1}$ such that $$-\frac{\pi}{M} < \Omega_{n+1} \leq \frac{\pi}{M}, \quad (10)$$

where $$\Omega_{n+1} 32 \ (\Delta\phi_{n+1} - \Delta\emptyset_{n+1}) \bmod 2\pi, \text{tm} \quad (11)$$

and $\Delta\phi_{n+1}$ is a parameter which is generated by a recursive form. This means that $\Delta\phi_{n+1}$ is a function of $\Delta\phi_n$, $\Delta\phi_{n-1}$, . . ., $\Delta\phi_{n-v}$, $\Delta\overline{\emptyset}_n$, $\Delta\overline{\emptyset}_{n-1}$, . . . , $\Delta\overline{\emptyset}_{n-\mu}$ and $\Delta\psi_{n+1}(1)$, where v and $\mu$ are nonnegative integers and $\Delta\psi_{n+1}(1)$ is the one-interval phase difference for time (n+1)T.

If the phase of the received signal sample for time (n+1)T, $\psi_{n+1}$, is available, then $\Delta\phi_{n+1}$ can also be calculated by $\psi_{n+1} - \phi_n$, where the parameter $\phi_n$ is called the phase reference for time nT which is generated by a recursive form. This means that $\phi_n$ is a function of $\phi_{n-1}$, $\phi_{n-2}$, . . . , $\phi_{n-v-1}$, $\Delta\overline{\emptyset}_n$, $\Delta\overline{\emptyset}_{n-1}$, . . . , $\Delta\overline{\emptyset}_{n-\mu}$ and $\psi_n$, where v and $\mu$ are nonnegative integers and $\psi_n$ is the phase of a received signal sample for time nT.

The decision rule of finding a data phase $\Delta\emptyset_{n+1}$ such that $-\frac{\pi}{M} < \Omega_{n+1} \leq \frac{\pi}{M}$ is equivalent to finding a data phase $\Delta\emptyset_{n+1}$ that minimizes $|\Omega_{n+1}|$.

Either the recursive form for generating $\Delta\phi_{n+1}$ or the recursive form for generating $\phi_n$ can be easily implemented and hence the differential detection method of this invention has low complexity of detection. Furthermore, the differential detection method of this invention has very good error performance.

We now show a specific recursive form which can easily generate the phase reference $\phi_n$ for time nT. The recursive form is given by $$\phi_n = \begin{cases} \dfrac{W_n(\phi_{n-1} + \Delta\overline{\phi}_n) + W_n'(\psi_n + 2L_n\pi)}{W_n + W_n'}, & \text{for } n \geq 1, \\ \psi_0, & \text{for } n = 0, \end{cases} \quad (12)$$

where $W_n$ and $W_n'$ are weight factors assigned for n, and $L_n$ is an integer which is used such that $$-\pi < (\phi_{n-1} + \Delta\overline{\emptyset}_n) - (\psi_n + 2L_n\pi) \leq \pi.\text{tm} \quad (13)$$

The phase reference generated from the recursive form given in equation (12) is equivalent to the weighted sum of all the primitive phase references derived from previously received signal samples, i.e., $$\phi_n = \sum_{l=1}^{n+1} a_n^{(l)} (\Psi_n^{(l)} + 2I_n^{(l)}\pi), \text{ for } n \geq 0, \quad (14)$$

where $I_n^{(l)}$ is an integer, $a_0^{(1)}$ and $$a_n^{(l+1)} = \begin{cases} \dfrac{W_{n-l}'}{W_{n-l} + W_{n-l}'} \times \prod_{i=1}^{l} \dfrac{W_{n-l+i}}{W_{n-l+i} + W_{n-l+i}'} & \text{for } n > l \\ \prod_{i=1}^{l} \dfrac{W_{n-l+i}}{W_{n-l+i} + W_{n-l+i}'} & \text{for } n = l. \end{cases} \quad (15)$$

Hence, the proposed differential detection method takes into account the information from all the-previously received signal samples and all the previously decided data phases.

For the first embodiment, we use a sequence of phases of the received signal samples as input to generate a sequence of data phases as ouput. In the first embodiment, equation (12) is used with $W_n = W$ and $W_n' = 1$ for all n. The block diagram for the first embodiment is shown in FIG. 1.

In some applications, the phases $\psi_{n+1}$ and $\psi_n$ may not be available while the one-interval phase difference for time (n+1)T, $\Delta\psi_{n+1}(1) = \psi_{n+1} - \psi_n$, is available. We will use a recursive form to generate $\Delta\psi_{n+1}$ directly. Note that the recursive form (12) is equivalent to the recursive form $$\Delta\phi_{n+1} = \begin{cases} \Delta\psi_{n+1}(1) + \dfrac{W_n(\Delta\phi_n - \Delta\overline{\phi}_n + 2J_n\pi)}{W_n + W_n'}, & \text{for } n \geq 1, \\ \Delta\psi_1(1), & \text{for } n = 0, \end{cases} \quad (16)$$

where $J_n$ is an interger which is used such that $$-\pi < \Delta\phi_n - \Delta\overline{\emptyset}_n + 2J_n\pi \leq \pi.\text{tm} \quad (17)$$

The input of this detection operation is $\Delta\psi_{n+1}(1)$. The phase difference $\Delta\psi_{n+1}(1)$ can be obtained by subtracting $\psi_n$ from $\psi_{n+1}$ or by directly processing the received signal sequence and a delayed version of it so as to extract the phase difference.

Figure 2:
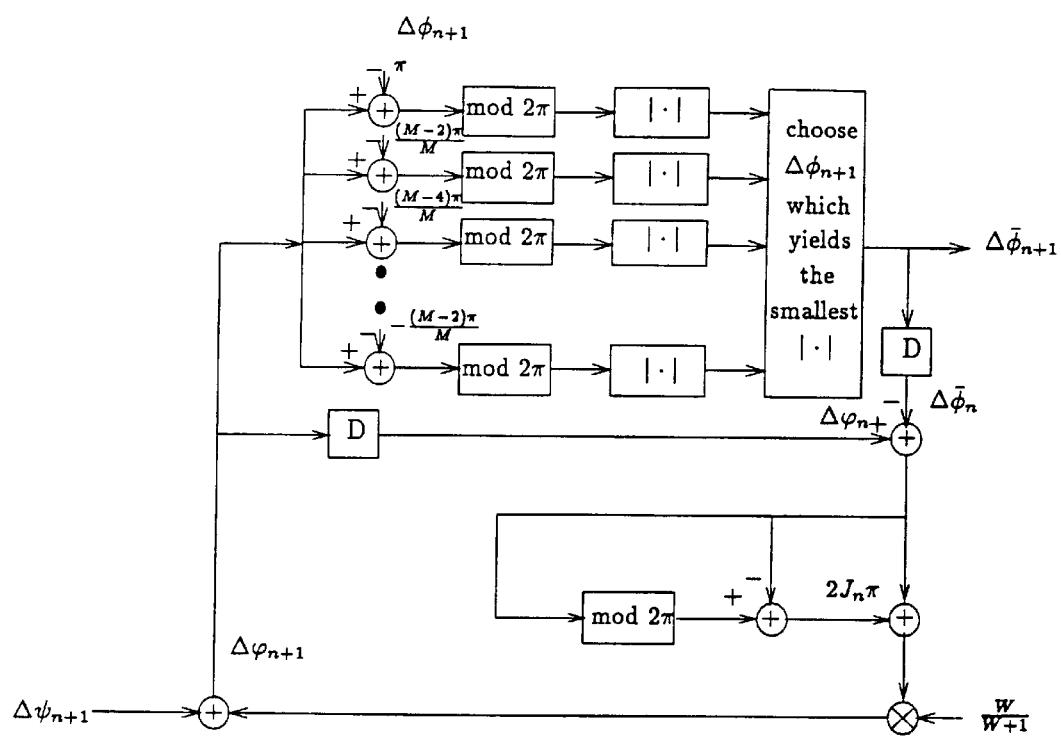
FIG. 2 illustrates block diagram for the second embodiment.

For the second embodiment, we use a sequence of phase differences as input to generate a sequence of data phases as ouput. In the second embodiment, equation (16) is used with $W_n = W$ and $W_n' = 1$ for all n. The block diagram for the second embodiment is shown in FIG. 2.

Figure 3:
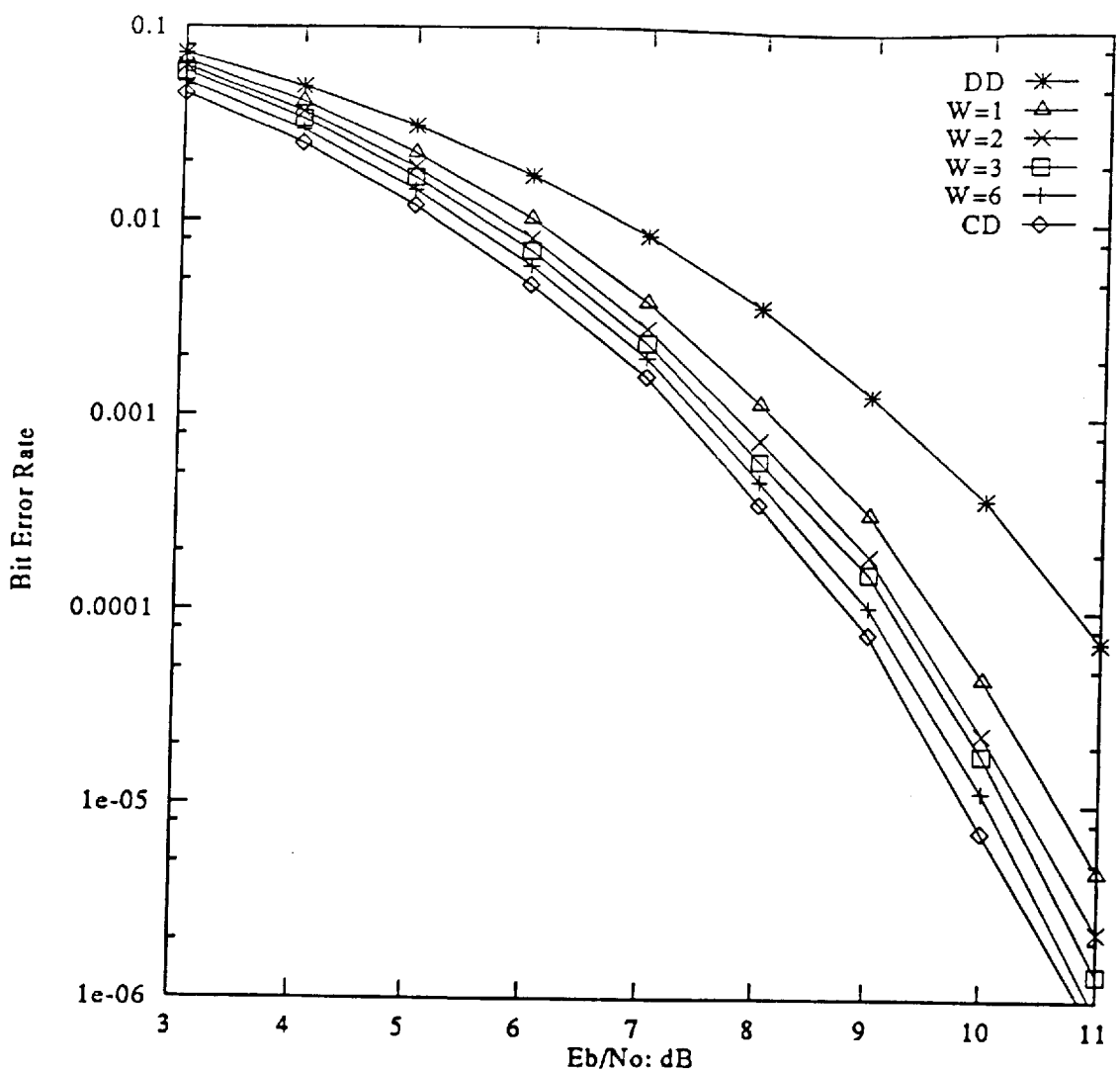
FIG. 3 illustrates the simulation results of the the first embodiment for M=4 with various W, where DD represents the conventional differential detection and CD represents the coherent detection.
Figure 4:
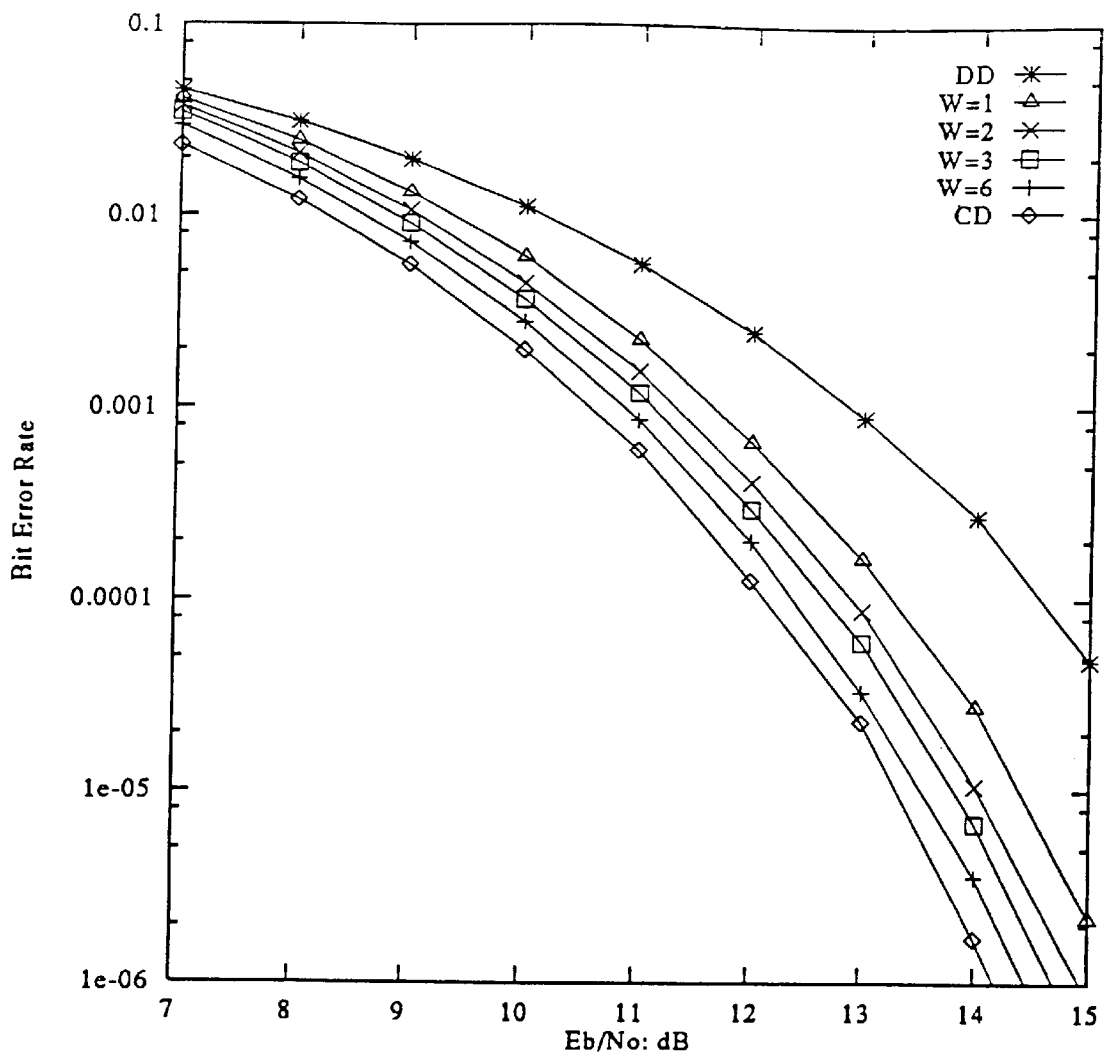
FIG. 4 illustrates the simulation results of the the first embodiment for M=8 with various W, where DD represents the conventional differential detection and CD represents the coherent detection.
Figure 5:
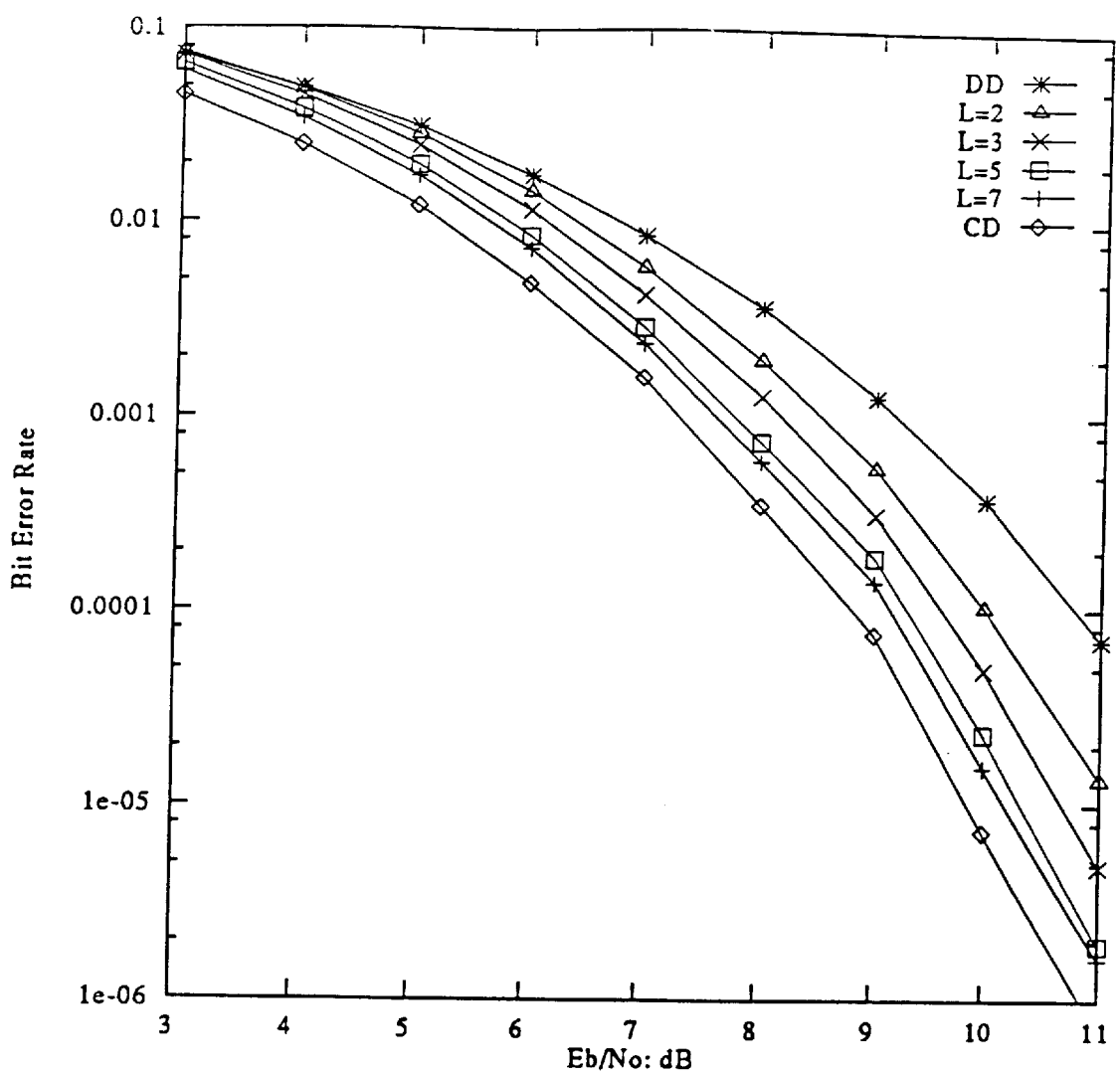
FIG. 5 illustrates the simulation results of conventional DF-DPD for M=4 with various L, where DD represents the conventional differential detection and CD represents the coherent detection.
Figure 6:
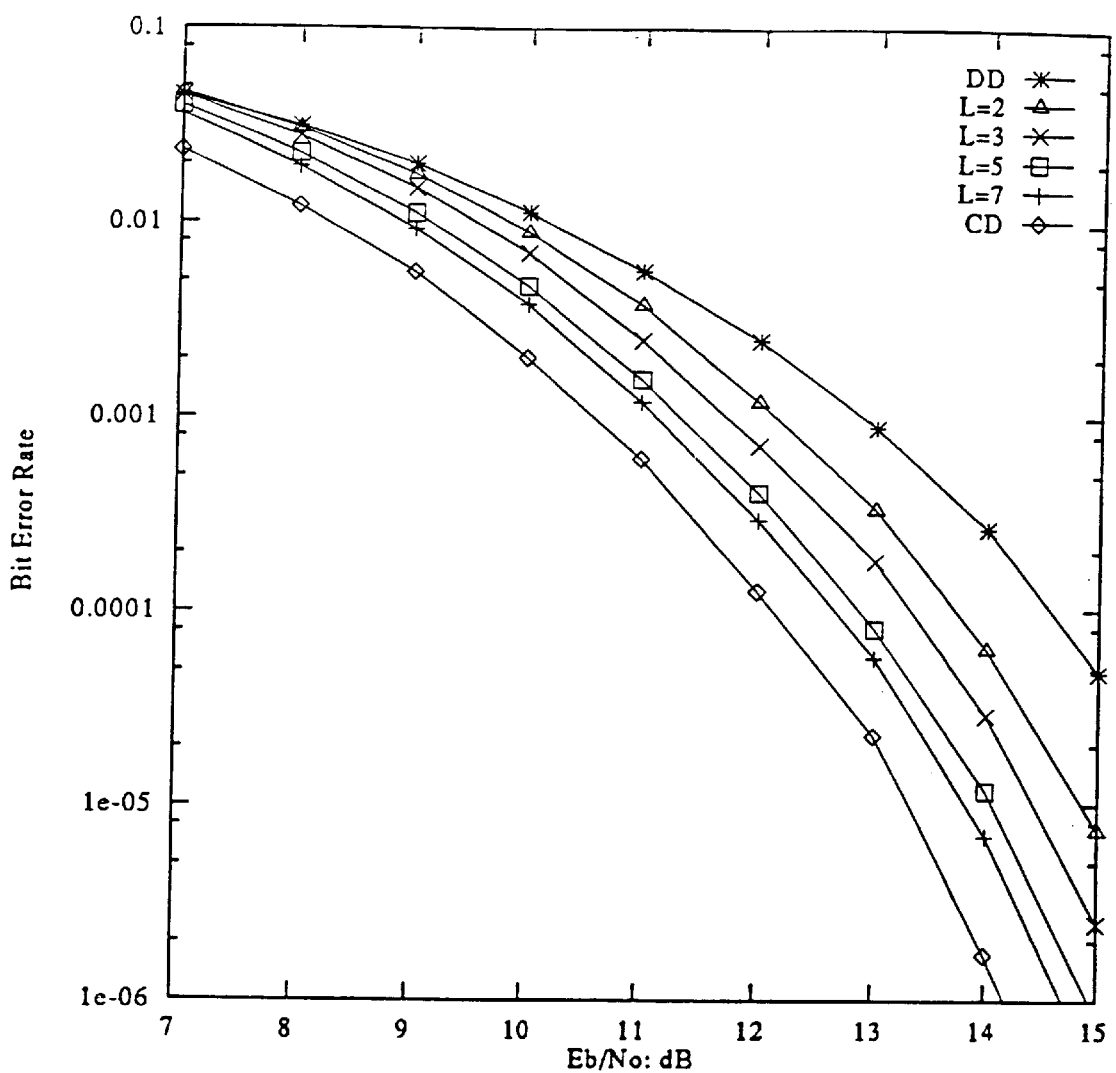
FIG. 6 illustrates the simnulation results of conventional DF-DPD for M=8, where DD represents the conventional differential detection and CD represents the coherent detection.

Error performance of the detection using the first embodiment over the additive white Gaussian noise (AWGN) channel for M=4 and 8 with various W, which are derived from simulation, are given in FIG. 3 and 4 respectively. For comparison, simulation results of the receiver using conventional DF-DPD over the AWGN channel for M=4 and 8 with various L are given in FIG. 5 and 6 respectively. Since the second embodiment is equivalent to the first embodiment, the error performance of the second embodiment is the same as that of the first embodiment. In all the simulations, we assume that $\theta_k$ is constant for all k.

For either conventional DF-DD or conventional DF-DPD, the error performance is better for larger L. However, a larger L implies a higher complexity of detection. For either the first embodiment or the second embodiment, the error performance is better for a larger W. Note that the complexity of detection using the proposed method is independent of W if we disregard the complexity of mathematical operations with large numbers. The choice of W will depend on the speed of the channel variation. In a fastly varying channel, small W is preferred.

In some applications, a more general recursive form for generating the phase reference will be used. The more general recursive form is $$\phi_n = \begin{cases} \dfrac{W_n^{(1)}(\phi_{n-1} + \Delta\overline{\phi}_n + 2L_n^{(1)}\pi) + W_n^{(2)}(\phi_n + 2L_n^{(2)}\pi)}{W_n^{(3)} + W_n^{(4)}}, & \text{for } n \geq 1, \\ \psi_0, & \text{for } n = 0, \end{cases} \quad (18)$$

where $W_n^{(1)}$, $W_n^{(2)}$, $W_n^{(3)}$ and $W_n^{(4)}$ are weight factors assigned for n and $L_n^{(1)}$ and $L_n^{(2)}$ are integers which are used such that $$-\pi < (\phi_{n-1} + \Delta\overline{\phi}_n + 2L_n^{(1)}\pi) - (\psi_n + 2L_n^{(2)}\pi) \leq \pi. \text{tm (19)}$$

In some applications, the phase reference $\phi_n$ can be generated by several recursive equations. Let $\phi_n = \phi_n^{(1)}$. The phase reference $\phi_n^{(1)}$ can be generated by recursive equations given by $$\phi_n^{(i)} = \begin{cases} \dfrac{\sum_{j=1}^{q} W_n^{(i,j)}(\phi_{n-1}^{(j)} + \Delta\overline{\phi}_n + 2L_n^{(j)}\pi) + W_n^{(i,q+1)}(\psi_n + 2L_n^{(q+1)}\pi)}{V_n^{(i,1)} + V_n^{(i,2)} + \ldots + V_n^{(i,q+1)}}, & \text{for } n \geq 1, \\ \psi_0, & \text{for } n = 0, \end{cases} \quad (20)$$

for $i \in \{1,2,\ldots,q\}$, where $W_n^{(i,1)}$, $W_n^{(i,2)}$, ..., $W_n^{(i,q+1)}$, $V_n^{(i,1)}$, $V_n^{(i,2)}$, ..., and $V_n^{(i,q+1)}$ for $i \in \{1,2,\ldots,q\}$ are weight factors assigned for n and $L_n^{(j)}$ for $j \in \{1,2,\ldots,q+1\}$ is an integer which is used such that $$-\pi < (\phi_{n-1}^{(j)} + \Delta\overline{\phi}_n + 2L_n^{(j)}\pi) - (\psi_n + 2L_n^{(q+1)}\pi) \leq \pi. \text{tm (21)}$$

In some applications, the parameter $\Delta\phi_{n+1}$ can be generated by several recursive equations. Let $\Delta\phi_{n+1} = \Delta\phi_{n+1}^{(1)}$, which is generated by recursive equations given by $$\Delta\phi_{n+1}^{(i)} = \qquad (22)$$

$$\begin{cases} \Delta\psi_{n+1}(1) + \sum_{j=1}^{q} \dfrac{W_n^{(i,j)}(\Delta\phi_n^{(j)} - \Delta\overline{\phi}_n + 2J_n^{(j)}\pi)}{W_n^{(i,1)} + W_n^{(i,2)} + \ldots + W_n^{(i,q+1)}}, & \text{for } n \geq 1, \\ \Delta\psi_1(1), & \text{for } n = 0, \end{cases}$$

for $i \in \{1,2,\ldots,q\}$ where $W_n^{(i,1)}$, $W_n^{(i,2)}$, ..., and $W_n^{(i,q+1)}$ for $i \in \{1,2,\ldots,q\}$ are weight factors assigned for n and $J_n^{(j)}$ for $j \in \{1,2,\ldots,q\}$ is an integer which is used such that $$-\pi < \Delta\phi_n^{(j)} - \Delta\overline{\phi}_n) + 2J_n^{(j)}\pi \leq \pi. \text{tm (23)}$$

In some applications, the phase reference $\phi_0$ at the beginning time of operation (n=0) can be an arbitrarily assigned phase value to simplify the implementation.

What is claimed is:

1. A method for detecting received signal sequences of a communication system transmitting differentially encoded MPSK signal sequences, of which the output of an (n+1)th detection operation is $\Delta\overline{\Phi}_{n+1}$ that is chosen to be the one among M possible values of a data phase $\Delta\Phi_{n+1}$ that minimizes $|\Omega_{n+1}|$ wherein $$\Omega_{n+1} = (\Delta\phi_{n+1} - \Delta\Phi_{n+1}) \mod 2\pi, \qquad (24)$$

whereby the parameter $\Delta\phi_{n+1}$ is a function of $\Delta\phi_n$, $\Delta\phi_{n-1}$, $\Delta\overline{\Phi}_n$, $\Delta\overline{\Phi}_{n-1}$, ..., $\Delta\overline{\Phi}_{n-\mu}$ and $\Delta\psi_{n+1}(1)$, wherein $\Delta\psi_{n+1}(1)$ is a one-interval phase difference for time (n+1)T v and $\mu$ are nonnegative integers, and wherein said $\Delta\phi_{n+1}$ is equal to $\Delta\phi_{n+1}^{(1)}$, which is generated by recursive equations given by $$\Delta\phi_{n+1}^{(j)} = \qquad (25)$$

$$\begin{cases} \Delta\psi_{n+1}(1) + \sum_{j=1}^{q} \dfrac{W_n^{(i,j)}(\Delta\phi_n^{(j)} - \Delta\overline{\phi}_n + 2J_n^{(j)}\pi)}{W_n^{(i,1)} + W_n^{(i,2)} + \ldots + W_n^{(i,q+1)}}, & \text{for } n \geq 1, \\ \Delta\psi_1(1), & \text{for } n = 0, \end{cases}$$

for $i = \epsilon\{1,2,\ldots,q\}$ whereby $W_n^{(i,1)}$, $W_n^{(i,2)}$, ... and $W_n^{(i,q+1)}$ for $i = \epsilon\{1,2,\ldots,q\}$ are weight factors assigned for n, an $J_n^{(i)}$ for $j = \epsilon\{1,2,\ldots,q\}$, is an integer which is used such that $$-\pi < (\Delta\psi_n^{(j)} - \Delta\overline{\Phi}_n) + 2J_n^{(j)}\pi \leq \pi. \qquad (26).$$

2. A method for detecting received signal sequences of a communication system transmitting differentially encoded MPSK signal sequences, wherein $\Delta100_{n+1}$ is calculated by $\psi_{n+1} - \phi_n$, whereby the parameter $\phi_n$ is a phase reference that is a function of $\Delta\phi_{(n-1)}$, $\Delta100_{n-2}$, $\Delta\overline{\Phi}_{n-v-1}$, $\Delta\phi\overline{\Phi}_n$, $\Delta\overline{\Phi}_{n-1}$, ..., $\Delta\overline{\Phi}_{n-\mu}$ and $\psi_n$, wherein $\psi_n$ is the phase of a received signal sample for time nT, wherein v and $\mu$ are nonnegative integers, and wherein said $\phi_n$ is equal to $\phi_n^{(1)}$, which is generated by recursive equations given by $$\Delta\phi_n^{(i)} = \begin{cases} \dfrac{\sum_{j=1}^{q} W_n^{(i,j)}(\Delta\phi_{n-1}^{(j)} - \Delta\overline{\phi}_n + 2L_n^{(j)}\pi) + W_n^{(i,q+1)}(\psi_n + 2L_n^{(q+1)}\pi)}{V_n^{(i,1)} + V_n^{(i,2)} + \ldots + V_n^{(i,q+1)}}, & \text{for } n \geq 1, \\ \Delta\psi_0, & \text{for } n = 0, \end{cases} \quad (28)$$

for $i = \epsilon\{1,2,\ldots,q\}$ whereby $W_n^{(i,1)}$, $W_n^{(i,2)}$, ..., $W_n^{(1,q+1)}$, $V_n^{(1,1)}$, $V_n^{(1,2)}$, ..., and $V_n^{(i,q+1)}$ for $i = \epsilon\{1,2,\ldots,q\}$ are weight factors assigned for n, an $L_n^{(j)}$ for $j = \epsilon\{1,2,\ldots,q+1\}$, is an integer which is used such that $$-\pi < (\Delta\phi_{n-1}^{(j)} + \Delta\overline{\Phi}_n + 2L_n^{(j)}90) - (\psi_n + 2L_n^{(q+1)}\pi) \leq \pi. \text{tm (29)}.$$

3. A method for detecting received signal sequences of a communication system transmitting differentially encoded MPSK signal sequences as in claim 2, wherein $W_n^{(i,j)} = V_n^{(i,j)}$ for $i \in \{1,2,\ldots,q\}$ and $j \in \{1,2,\ldots,q+1\}$.

4. A method for detecting received signal sequences of a communication system transmitting differentially encoded MPSK signal sequences as in claim 1, wherein $\Delta\phi_n^{(i)}$ is an arbitrarily assigned phase value instead of $\Delta\psi_1$ for some $i \in \{1,2,\ldots,q\}$.

5. A method for detecting received signal sequences of a communication system transmitting differentially encoded MPSK signal sequences as in claim 2, wherein $\phi_0^{(i)}$ is an arbitrarily assigned phase value instead of $\psi_0$ for some $i \in \{1,2,\ldots,q\}$.

6. A method for detecting received signal sequences of a communication system transmitting differentially encoded MPSK signal sequences as in claim 1, wherein q=1.

7. A method for detecting received signal sequences of a communication system transmitting differentially encoded MPSK signal sequences as in claim 2, wherein q=1.

8. A method for detecting received signal sequences of a communication system transmitting differentially encoded MPSK signal sequences as in claim 6, wherein $W_n^{(1,1)}=W$ and $W_n^{(1,2)}=W'$, whereby W and W' are constants.

9. A method for detecting received signal sequences of a communication system transmitting differentially encoded MPSK signal sequences as in claim 7, wherein $W_n^{(1,1)}=V_n^{(1,1)}=W$ and $W_n^{(1,2)}=W'$, whereby W and W' are constants.

10. A method for detecting received signal sequences of a communication system transmitting differentially encoded MPSK signal sequences as in claim 6, wherein $W_n^{(1,1)}=W$ and $W_n^{(1,2)}=W'|r_n|$, whereby $|r_n|$ is the amplitude of the n-th received signal sample, W and W' are constants.

11. A method for detecting received signal sequences of a communication system transmitting differentially encoded MPSK signal sequences as in claim 7, wherein $W_n^{(1,1)}=V_n^{(1,1)}=W$ and $W_n^{(1,2)}=V_n^{(1,2)}=W'|r_n|$, whereby $|r_n|$ is the amplitude of the n-th received signal sample, W and W' are constants.

12. A method for detecting received signal sequences of a communication system transmitting differentially encoded MPSK signal sequences as in claim 7, wherein $W_n^{(1,1)}=W_1$, $W_n^{(1,2)}=W_2|r_n|$, $V_n^{(1,1)}=W_3$, and $V_n^{(1,2)}=W_4$, whereby $W_1$, $W_2$, $W_3$, and $W_4$ are constants.

* * * * *